United States Patent
MacFarlane et al.

(10) Patent No.: US 6,502,630 B1
(45) Date of Patent: Jan. 7, 2003

(54) COMBINED HYDRAULIC FLUID COOLER/TANK

(75) Inventors: Ian Alexander MacFarlane, St. Bruno (CA); Keith Martin Morgan, Montreal (CA); Thomas Francis Haslam-Jones, Brossard (CA); Nigel Walters, St. Laurent (CA); Jean Omer Gagnon, Westmount (CA)

(73) Assignee: Pratt & Whitney Canada Corp., Quebec (CA)

( * ) Notice: Subject to any disclaimer, the term of this patent is extended or adjusted under 35 U.S.C. 154(b) by 0 days.

(21) Appl. No.: 10/011,069

(22) Filed: Dec. 3, 2001

(51) Int. Cl.$^7$ ................................................ F01P 11/08
(52) U.S. Cl. .................. 165/916; 123/196 AB; 184/104.3
(58) Field of Search ................ 165/51, 916; 123/41.33, 123/196 AB; 184/104.1, 104.3

(56) References Cited

U.S. PATENT DOCUMENTS

| | | | |
|---|---|---|---|
| 2,450,960 A | 10/1948 | Heintz | |
| 4,073,338 A | * 2/1978 | Fujikake et al. | 165/86 |
| 4,109,702 A | * 8/1978 | Greene | 165/51 |
| 4,316,434 A | * 2/1982 | Bailey | 165/109 |
| 4,344,479 A | * 8/1982 | Bailey | 165/109 |
| 4,471,835 A | * 9/1984 | Laing et al. | 165/109 |
| 4,683,714 A | 8/1987 | Thebert | |
| 4,947,963 A | 8/1990 | Aho, Jr. | |
| 4,991,643 A | * 2/1991 | Price et al. | 165/916 |
| 5,101,885 A | 4/1992 | Drake | |
| 5,718,281 A | 2/1998 | Bartalone et al. | |
| 5,746,270 A | * 5/1998 | Schroeder et al. | 165/51 |
| 6,155,336 A | 12/2000 | Schwartz | |
| 6,261,448 B1 | * 7/2001 | Merchant et al. | 165/916 |

* cited by examiner

*Primary Examiner*—Henry Bennett
*Assistant Examiner*—Terrell McKinnon
(74) *Attorney, Agent, or Firm*—Bachman & LaPointe, P.C.

(57) ABSTRACT

A convectively-cooled hydraulic fluid tank system comprises a hydraulic fluid tank and a fluid cooler incorporated into the hydraulic fluid tank. The fluid cooler includes a vortex chamber having a wall made of a heat conductive material. An inlet is provided to direct incoming pressurized hydraulic fluid tangentially onto the inner surface of the vortex chamber wall to create a swirled flow of hydraulic fluid against the inner surface of the wall. A cooling structure extends from an exterior surface of the vortex chamber wall to promote heat dissipation.

20 Claims, 3 Drawing Sheets

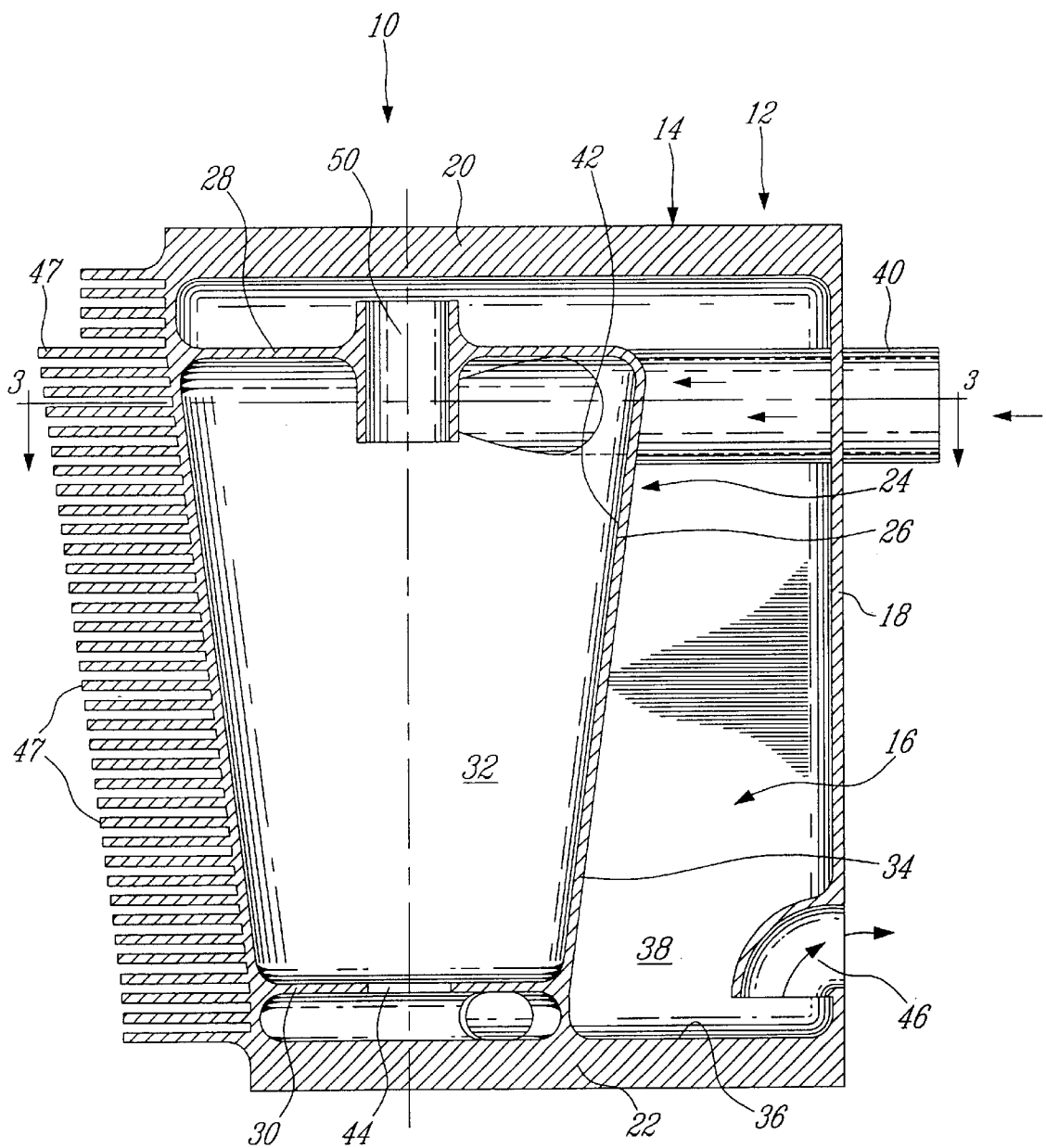
FIG_2

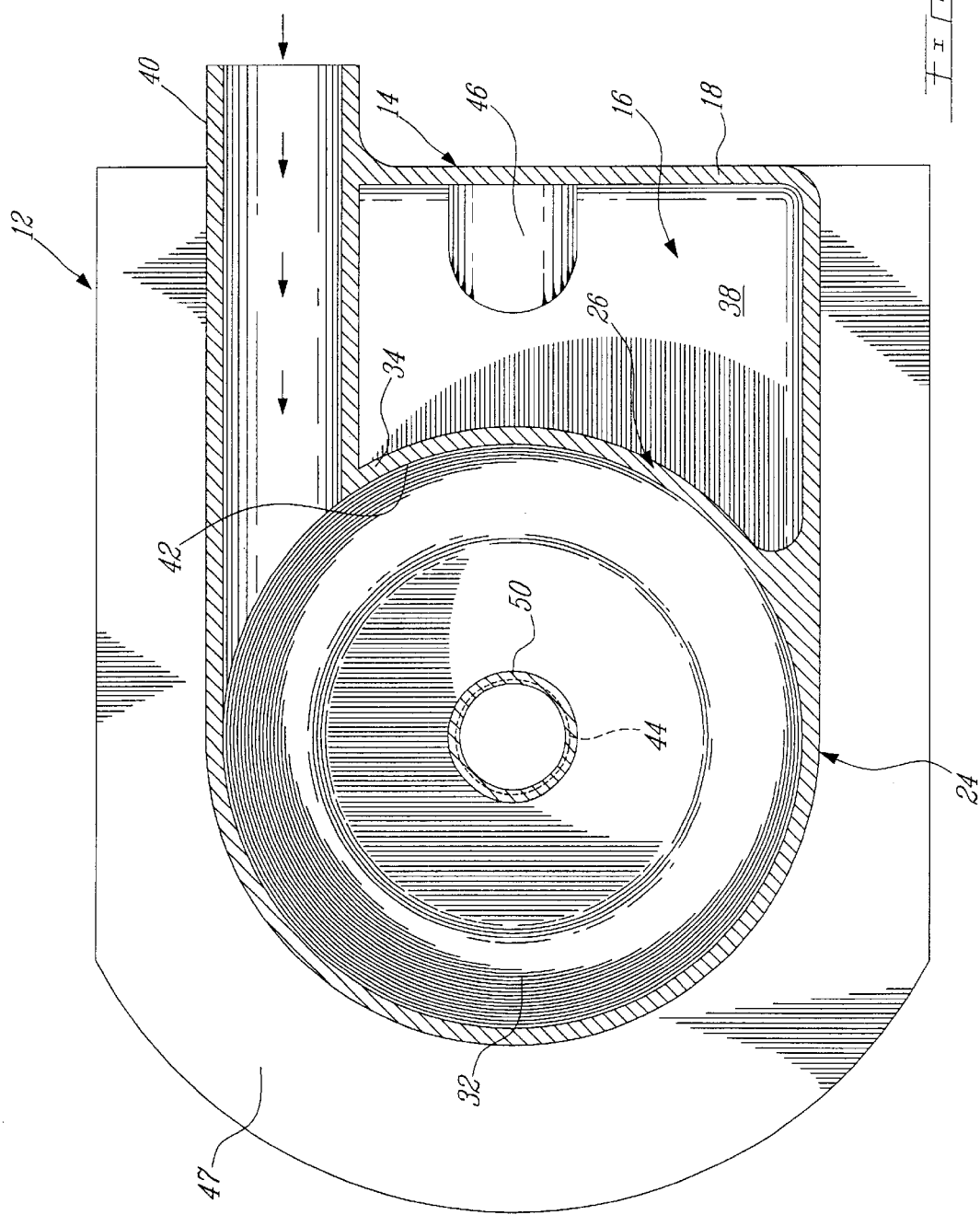

COMBINED HYDRAULIC FLUID COOLER/TANK

BACKGROUND OF THE INVENTION

1. Field of the Invention

The present invention relates generally to hydraulic fluid reservoirs and, more particularly, to a hydraulic fluid reservoir including a cooling system.

2. Description of the Prior Art

Aircraft engines require lubrication. Aircraft turbine engine lubricating systems generally comprise a hydraulic circuit including a pump drawing oil from an oil tank to provide lubrication to engine components, such as bearings, via distribution lines, and return lines to return the oil back into the tank. A separate oil cooler, such as an air-cooled oil cooler or a fuel-oil heat exchanger, is typically connected to the return line in series with the oil tank to cool the lubricating oil that has been pumped therefrom. Such a separate oil cooler adds to the cost and weight of the engine lubricating system.

U.S. Pat. No. 4,947,963 issued on Aug. 14, 1990 to Aho discloses a vented oil supply reservoir for aircraft comprising a substantially cylindrical swirl vessel enclosed within an oil tank for permitting venting and adequate supply of oil at all altitudes. Return oil from exterior equipment is tangentially introduced into the swirl vessel so as to create a forced vortex in the vessel. A drain is provided at the bottom of the vessel to permit excess oil to drain into the interior of the oil tank about the swirl vessel. This arrangement requires a separate oil cooler external to the oil tank to cool the lubricating oil that has been pumped therefrom.

U.S. Pat. No. 5,718,281 issued on Feb. 17, 1998 to Bartalone et al. discloses a combined cooler, reservoir and filter for an automobile power steering system. The reservoir comprises a frusto-conical sidewall made of heat conductive material and having cooling fins extending outwardly therefrom. The oil is introduced into the interior of the reservoir via an inlet provided at a bottom end thereof and is caused to flow axially upwardly before being recirculated axially downwardly along the inner surface of the frusto-conical side wall. Air is circulated over the cooling fins to remove heat from the power steering fluid contacting the interior surface of the frusto-conical wall.

Although, the combined cooler, reservoir and filter disclosed in the above-mentioned patent performs satisfactorily when used in an automobile power steering system, it has been found that there is a need for a new convectively-cooled fluid reservoir offering increased cooling capacity.

SUMMARY OF THE INVENTION

It is therefore an aim of the present invention to provide a new hydraulic fluid reservoir wherein the hydraulic fluid is cooled within the reservoir, thereby dispensing with the need for a separate hydraulic fluid cooler.

It is also an aim of the present invention to increase the heat dissipation rate of a hydraulic fluid reservoir.

It is a further aim of the present invention to provide a new method of cooling a hydraulic fluid within a reservoir.

Therefore, in accordance with the present invention, there is provided a combined cooler and oil tank system, comprising an oil tank having a tank cavity, a vortex chamber integrated to said oil tank, said vortex chamber having a side wall, an inlet at an upper end portion of said vortex chamber for directing incoming oil, under pressure, into said vortex chamber in a generally tangential fashion and causing said incoming oil to centrifugally contact an inner surface of said side wall while the oil swirls down to a lower end portion of said vortex chamber; a heat exchange promoting structure on an outer surface of said side wall of said vortex chamber for promoting heat transfer from the oil to a cooling fluid flowing over said heat exchange promoting structure as the oil swirls down along said inner surface, and an outlet at said lower end portion of said vortex chamber for directing cooled oil into said tank cavity.

In accordance with a further general aspect of the present invention, there is provided a convectively-cooled hydraulic fluid tank apparatus comprising a hydraulic fluid tank, a fluid cooler incorporated into said hydraulic fluid tank, said fluid cooler including a vortex chamber having a wall at least partly made of a heat conductive material, said wall having inner and outer surfaces, an inlet directing incoming pressurized hydraulic fluid tangentially onto said inner surface of said wall to create a swirled flow of hydraulic fluid against said inner surface of said wall, and a heat transfer promoting structure on said outer surface of said wall.

In accordance with a further general aspect of the present invention, there is provided a method of cooling a hydraulic fluid within a tank, comprising the steps of: providing a vortex chamber within a tank, directing a hydraulic fluid to be cooled into said vortex chamber in a tangential fashion, causing said hydraulic fluid to centrifugally contact an inner surface of a wall of said vortex chamber while said hydraulic fluid flows along said inner surface, and cooling the hydraulic fluid maintained in contact with the inner surface of the wall by removing heat from the hydraulic fluid through the wall.

The term hydraulic is herein intended to characterize any fluid that is circulated through conduits usually by pressure.

BRIEF DESCRIPTION OF THE DRAWINGS

Having thus generally described the nature of the invention, reference will now be made to the accompanying drawings, showing by way of illustration a preferred embodiment thereof, and in which:

FIG. 2 is a vertical cross-sectional view of the air-cooled oil tank system of FIG. 1; and FIG. 3 is a cross-sectional view taken along line 3—3 in FIG. 2.

DESCRIPTION OF THE PREFERRED EMBODIMENTS

Figure 1:
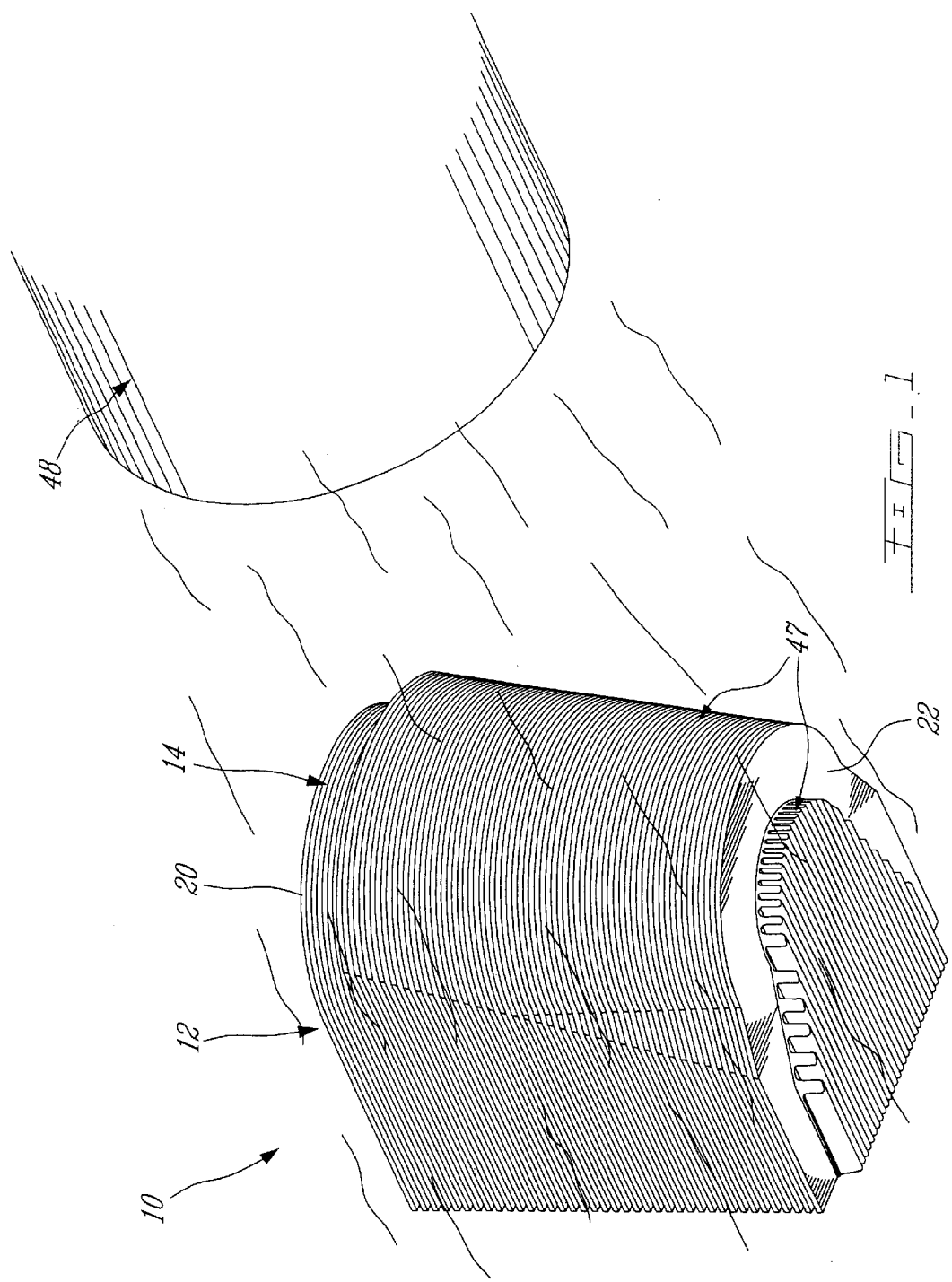
FIG. 1 is a perspective view of an air-cooled oil tank system in accordance with a preferred embodiment of the present invention.

Now referring to the drawings, an air-cooled oil tank system embodying the elements of the present invention and generally designated by the numeral 10 will be described.

The air-cooled oil tank system 10 is principally intended to be used in the hydraulic circuit of a gas turbine engine lubricating system, though other applications are possible generally wherever air cooling is feasible. As will be seen hereinafter, the air-cooled oil tank system 10 eliminates the need for a separate oil cooler or heat exchanger in order to dissipate heat generated within the engine lubricating system.

More specifically, as shown in FIG. 2, the air-cooled oil tank system 10 generally comprises an oil tank 12 having a hollow body 14 defining a tank cavity 16. The body 14 is preferably made from a heat conductive metallic material and has an exterior sidewall 18 extending between top and bottom end walls 20 and 22. It is noted that one of the end walls 20 and 22 could be provided in the form of a removable cover to provide access to the tank cavity 16.

A vortex chamber 24 is located within the tank cavity 16. The vortex chamber 24 has a frusto-conical sidewall 26 tapering from a top end wall 28 to a bottom end wall 30 and defining therewith a swirl chamber 32. The top end wall 28 of the vortex chamber 24 is spaced inwardly from an inner surface of the top end wall 20 of the oil tank body 14. As can be seen from FIGS. 2 and 3, the frusto-conical sidewall 26 is in part formed by the exterior wall of the oil tank body 14 and by a partition wall 34 extending from an inner surface 36 of the bottom wall 22 of the oil tank body 14. The partition wall 34 and the top end wall 20 of the vortex chamber 24 divides the tank cavity 16 into the swirl chamber 32 and an oil storage chamber 38.

An inlet pipe 40 adapted to be connected to a return line (not shown) extends through the exterior sidewall 18 of the oil tank body 14, the storage chamber 38 and into an upper end portion of the vortex chamber 24. As shown in FIG. 3, the inlet pipe 40 is tangential to the frusto-conical sidewall 26 of the vortex chamber 24 to supply hot oil under pressure in a tangential fashion onto the inner surface 42 of the frusto-conical sidewall 26 and cause the oil to centrifugally adhere thereto while swirling downwardly along the inner surface 42 towards the bottom end wall 30.

As shown in FIG. 2, a central drain hole 44 is defined in the bottom wall 30 of the vortex chamber 24. The drain hole 44 leads to the oil storage chamber 38. An outlet 46 is defined in the exterior sidewall wall 18 of the oil tank body 14. The outlet 46 is adapted to be connected in fluid flow communication with a pump inlet (not shown) for allowing the cool oil to be pumped out of the oil storage chamber 38.

Vertically spaced-apart cooling fins 47 extend integrally outwardly from an outer surface of the exterior sidewall 18 of the oil tank body 14 about almost the entire periphery thereof. The cooling fins 47 act as a heat exchange promoting structure to cool the oil as it swirls down on the inner surface 42 of the vortex chamber 24. As best shown in FIG. 2, the portion of the exterior sidewall 18 of the oil tank body 14 forming part of the frusto-conical sidewall 26 of the vortex chamber 24 is provided with enlarged fins 47 to enhance heat extraction from the film of oil maintained in centrifugal contact with the inner surface 42 of the frusto-conical sidewall 26. It is noted that the term "fin" is herein intended to encompass any extended surface specifically used to enhance the heat transfer rate between a solid and a fluid.

As shown in FIG. 1, a cooling fluid supply arrangement including ducting represented schematically at 48 is used to direct a flow of cooling fluid, such as cool air, over the fins 47 to convectively cool the fins 47, the exterior wall 18 and thus the film of oil on the inner surface thereof in the vortex chamber 24.

An air vent 50 is centrally defined in the top end wall 28 of the vortex chamber 24 and vents to the upper end portion of the storage chamber 38.

In use, hot oil is pumped into the oil tank 12, where it impinges tangentially onto the inner surface 42 of the frusto-conical sidewall 26 of the vortex chamber 24. The oil swirls in a circular downward motion on the inner surface 42 until it passes through the central drain 44 at the base of the swirl chamber 32 and into the storage chamber 38. As the oil rotates around the inner surface 42, heat is transferred from the oil into the frusto-conical sidewall 26 and, thus, into the cooling fins 47. Ducting 48 is used to direct flow of cool air over the finned surface of the oil tank 12. An exhaust (not shown) is provided at the rear of the tank 12 to remove the now heated air flow from the oil tank 12. As cool air flows over the surface of the oil tank fins 47, heat is extracted and hence, the oil within the swirl chamber 32 is cooled. The cool oil collected in the storage chamber 38 is then directed into the pressure pump inlet via the outlet 46.

Although the present invention is principally intended to be used in a gas turbine engine lubricating system, it is understood that it could be used in other hydraulic fluid systems necessitating fluid cooling. Throughout this application, it is understood that a "hydraulic fluid" includes any fluid used for lubrication, cooling or control purposes in a system and which would benefit from a process of periodic heat removal therefrom.

What is claimed is:

1. A combined cooler and oil tank system, comprising an oil tank having an oil storage cavity, a vortex chamber integrated to said oil tank, said vortex chamber having a side wall, an inlet at an upper end portion of said vortex chamber for directing incoming oil under pressure into said vortex chamber in a generally tangential fashion and causing said incoming oil to centrifugally contact an inner surface of said side wall while the oil swirls down to a lower end portion of said vortex chamber, a heat exchange promoting structure extending from an outer surface of said side wall of said vortex chamber for promoting heat transfer from the oil to a cooling fluid flowing over said heat exchange promoting structure as the oil swirls down along said inner surface, and an outlet at said lower end portion of said vortex chamber for directing cooled oil into said oil storage cavity.

2. A combined cooler and oil tank system as defined in claim 1, wherein said vortex chamber tapers from said upper end portion to said lower end portion.

3. A combined cooler and oil tank system as defined in claim 2, wherein said inner surface of said sidewall of said vortex chamber is frustoconical.

4. A combined cooler and oil tank system as defined in claim 1, wherein said vortex chamber is located within said tank cavity, and wherein said side wall of said vortex chamber forms part of an exterior wall of said oil tank.

5. A combined cooler and oil tank system as defined in claim 1, wherein said side wall defines an interior partition wall separating said oil storage cavity from said vortex chamber.

6. A combined cooler and oil tank system as defined in claim 1, wherein said vortex chamber has an air vent.

7. A combined cooler and oil tank system as defined in claim 6, wherein said air vent opens to said oil storage cavity.

8. A combined cooler and oil tank system as defined in claim 7, wherein said air vent is defined in a top end wall of said vortex chamber.

9. A combined cooler and oil tank system as defined in claim 1, wherein said heat exchange promoting structure includes a plurality of spaced-apart cooling fins.

10. A combined cooler and oil tank system as defined in claim 9, wherein said oil tank has a periphery, and wherein said cooling fins extend integrally outwardly from an exterior surface of said oil tank about at least a portion of the periphery thereof.

11. A combined cooler and oil tank system as defined in claim 1, wherein said oil storage cavity has an outlet hole adapted to be connected to a pump inlet.

12. A convectively-cooled hydraulic fluid tank apparatus comprising a hydraulic fluid tank, a fluid cooler incorporated into said hydraulic fluid tank, said fluid cooler including a vortex chamber having a wall at least partly made of a heat conductive material, said wall having inner and outer surfaces, an inlet directing incoming pressurized hydraulic fluid tangentially onto said inner surface of said wall to create a swirled flow of hydraulic fluid against said inner surface of said wall, and a heat transfer promoting structure extending from said outer surface of said wall.

13. A convectively-cooled hydraulic fluid tank apparatus as defined in claim 12, wherein a cooling fluid supply arrangement is provided for directing a flow of cooling fluid over at least a portion of said outer surface of said wall to cool the hydraulic fluid as the hydraulic fluid swirls along said inner surface of said wall.

14. A convectively-cooled hydraulic fluid tank apparatus as defined in claim 12, wherein said vortex chamber has an outlet located at one end portion thereof opposite said inlet.

15. A convectively-cooled hydraulic fluid tank apparatus as defined in claim 14, wherein said vortex chamber has upper and lower end portions, and wherein said inlet and said outlet are respectively provided at said upper and lower end portions of said vortex chamber.

16. A convectively-cooled hydraulic fluid tank apparatus as defined in claim 14, wherein said outlet leads to a storage cavity.

17. A convectively-cooled hydraulic fluid tank apparatus as defined in claim 12, wherein said inner surface of said wall of said vortex chamber has a frustoconical shape tapering in an axial direction away from said inlet.

18. A convectively-cooled hydraulic fluid tank apparatus as defined in claim 12, wherein said hydraulic fluid tank has a peripheral wall defining a tank cavity, and wherein said vortex chamber is located in said tank cavity, said wall of said vessel forming part of said peripheral wall.

19. A method of cooling a hydraulic fluid within a hydraulic tank, comprising the steps of: providing a vortex chamber within a hydraulic tank, directing a hydraulic fluid, to be cooled, into said vortex chamber in a tangential fashion, causing said hydraulic fluid to centrifugally contact an inner surface of a heat conductive wall of said vortex chamber while said hydraulic fluid flows along said inner surface, and cooling the hydraulic fluid maintained in contact with the inner surface of the wall by removing heat from the hydraulic fluid through the heat conductive wall.

20. A method as defined in claim 19, wherein the cooling step is effected by circulating a cooling fluid over an outer surface of the heat conductive wall so as to cause heat to be transferred from the hydraulic fluid on the inner surface of the heat conductive wall to the cooling fluid flowing over the outer surface of the wall.

* * * * *